US009286709B2

(12) United States Patent
Nash (10) Patent No.: US 9,286,709 B2
(45) Date of Patent: Mar. 15, 2016

(54) VARIABLE FRAME RATE RENDERING AND PROJECTION

(75) Inventor: Erik Nash, South Pasadena, CA (US)

(73) Assignee: DreamWorks Animation LLC, Glendale, CA (US)

(\*) Notice: Subject to any disclaimer, the term of this patent is extended or adjusted under 35 U.S.C. 154(b) by 1846 days.

(21) Appl. No.: 12/510,152

(22) Filed: Jul. 27, 2009

(65) Prior Publication Data

US 2011/0018881 A1   Jan. 27, 2011

(51) Int. Cl.
*G06T 13/00* (2011.01)

(52) U.S. Cl.
CPC .................................... *G06T 13/00* (2013.01)

(58) Field of Classification Search
None
See application file for complete search history.

(56) References Cited

U.S. PATENT DOCUMENTS

| 4,477,160 | A | 10/1984 | Trumbull |
| 4,560,260 | A | 12/1985 | Trumbull |
| 5,096,286 | A | 3/1992 | Weisgerber |
| 5,739,894 | A | 4/1998 | Weisgerber |
| 5,745,213 | A | 4/1998 | Goodhill et al. |
| 6,058,141 | A | 5/2000 | Barger et al. |
| 6,072,831 | A | 6/2000 | Chen |
| 6,535,232 | B1\* | 3/2003 | Tsuda et al. ................... 715/849 |
| 6,614,477 | B1 | 9/2003 | Lee et al. |
| 6,633,339 | B1 | 10/2003 | Goto et al. |
| 6,850,564 | B1 | 2/2005 | Pejhan et al. |
| 7,057,638 | B1 | 6/2006 | Yuuki et al. |
| 7,209,519 | B2\* | 4/2007 | Vetro et al. ............... 375/240.03 |
| 7,242,850 | B2 | 7/2007 | Cok |
| 7,280,708 | B2\* | 10/2007 | Song et al. ..................... 382/299 |
| 7,408,986 | B2 | 8/2008 | Winder |
| 7,457,471 | B2 | 11/2008 | Song et al. |
| 8,106,924 | B2\* | 1/2012 | Aliprandi et al. ............. 345/629 |
| 2005/0041002 | A1\* | 2/2005 | Takahara et al. ................ 345/76 |
| 2006/0250402 | A1\* | 11/2006 | Perlin .......................... 345/474 |
| 2007/0104462 | A1 | 5/2007 | Saito et al. |
| 2008/0211916 | A1\* | 9/2008 | Ono ............................. 348/164 |
| 2009/0087016 | A1\* | 4/2009 | Berestov et al. ............. 382/100 |
| 2009/0167768 | A1\* | 7/2009 | Bull et al. ..................... 345/473 |
| 2010/0103077 | A1\* | 4/2010 | Sugiyama et al. ................ 345/8 |
| 2010/0128145 | A1\* | 5/2010 | Pitts et al. ................ 348/231.99 |
| 2010/0231593 | A1\* | 9/2010 | Zhou et al. .................... 345/428 |
| 2010/0259627 | A1\* | 10/2010 | Trumbull et al. .......... 348/208.4 |
| 2011/0175865 | A1\* | 7/2011 | Bae et al. ...................... 345/204 |
| 2011/0310222 | A1\* | 12/2011 | Kim et al. ....................... 348/43 |

OTHER PUBLICATIONS

Anderson, J. et al. (1993). "The Myth of Persistence of Vision Revisited," *Journal of Film and Video* 45(1):3-12.
Drab, S. et al. (2005). "Motion Detection as Interaction Technique for Games & Applications on Mobile Devices," Presented at *Workshop at the Pervasive*, Munich, Germany, May 11, 2005, 4 pages.

(Continued)

*Primary Examiner* — David H Chu
(74) *Attorney, Agent, or Firm* — Morrison & Foerster LLP (57) ABSTRACT

In rendering a computer-generated animation sequence, pieces of animation corresponding to shots of the computer-generated animation sequence are obtained. Measurements of action in the shots are obtained. Frame rates, which can be different, for the shots are determined based on the determined measurements of action in the shots. The shots are rendered based on the determined frame rates for the shots. The rendered shots with frame rate information indicating the frame rates used in rendering the shots are stored.

18 Claims, 7 Drawing Sheets

(56) References Cited

OTHER PUBLICATIONS

Richardson, I. (2002). *Video Codec Design: Developing Image and Video Compression Systems.* Wiley. Table of Contents.

Shen, J. And Castan, S. (1992) "An Optimal Linear Operator for Step Edge Detection," *Computer Vision, Graphics and Image Processing* 54(2):112-133.

* cited by examiner

VARIABLE FRAME RATE RENDERING AND PROJECTION

BACKGROUND

1. Field

The present application generally relates to computer-generated animation, and, more particularly, to using variable frame rates in rendering and projecting a computer-generated animation sequence.

2. Related Art

When a succession of still images is viewed, the separate frames appear continuous and the objects in the frames appear to move in smooth motion. It has been found that a frame rate of 10 frames per second is sufficient to give the illusion of motion. However, the fewer frames per second, the less smooth the motion appears. For example, with a frame rate of 16 frames per second, the images may flicker or strobe. Flickering and strobing effects generally occur when the eye detects the individual frames of the picture, because the time between the frames is too long or the degree of motion with consecutive frames is too great.

Traditional films have a frame rate of 24 frames per second, but film projectors normally shutter at twice this rate (i.e., each frame is flashed twice), thus achieving a 48 Hertz refresh rate. To some extent, the higher refresh rate reduces the flickering and strobing effects without requiring more film, but audiences may still see a considerable amount of flicker in some cases.

One solution to the flickering or strobing problem is to increase the frame rate, e.g., to 48 frames per second or 60 frames per second. This improves the motion picture quality, but requires more film and is thus more costly. For example, U.S. Pat. Nos. 4,560,260 and 4,477,160, entitled "Motion Picture System," disclose a process for producing and projecting a motion picture, where the film frames are photographed and projected at a predetermined constant rate of more than 50 frames per second, such as 60 frames per second.

In another example, a commercial product known as the Maxivision system runs either at 24 frames per second or at 48 frames per second, which reduces strobing effects. The system uses normal 35 mm motion picture film, but captures images with a non-standard number of perforations of film per frame. While the amount of additional film needed to achieve the higher frame rate is reduced, it requires using fewer perforations of film per frame than the standard. See, U.S. Pat. No. 5,745,213, entitled "Method of making enhanced resolution motion picture release-print film."

Computer-generated animation can have similar flickering and strobing problems, especially during high-action or high-motion scenes. The speed at which objects appear to move in an animation is a function of the number of drawings used to obtain a movement and the distance between the object's positions in successive frames. For example, when animating a bouncing ball, the further the ball has moved in each adjacent frame, the faster the ball will appear to travel across the screen. If there is too much distance between the ball's positions in successive frames, the ball will appear to jump from one spot on the screen to another, rather than move smoothly.

In recent years, digital projection has paved the way for a new generation of three-dimensional (3D) cinema. However, 3D filmmakers also face problems with flickering and strobing effects, especially in high-action or high-motion scenes. A stereoscopic imaging system creates the illusion of depth in an image by presenting a slightly different image to each eye. The two slightly different images are called a stereo pair. In addition, only one eye is presented with an image at a time. Unfortunately, the alternating presentation of left and right eye imagery and the frequency at which the images are updated make the flickering and strobing effects in 3D cinema even more pronounced.

To alleviate part of the problem, the D-Cinema consortium, which focuses on digital cinema equipment certification, requires D-Cinema-compliant 3D projectors to implement a technique known as "triple flashing" of the stereo pair of images as a solution to perceptible flicker issues inherent in lower frequency refresh rates. With single-flashing, the left image is projected onto the screen for $1/48$ second, and then the right image is projected onto the screen for another $1/48$ second. Single-flashing presents to each eye a flicker rate, which is clearly perceptible and causes discomfort in the viewer. With double-flashing, the left image and the right image are alternately projected onto the screen, each staying on the screen for $1/96$ second, and then the stereo pair is flashed the same way a second time. Double-flashing is an improvement, but still yields perceptible flicker for some viewers under some circumstances. With triple-flashing, the left image and the right image are alternately projected onto the screen, each staying on the screen for $1/144$ second, and then the stereo pair is flashed the same way a second and a third time. Under normal circumstances, triple-flashing provides a flicker frequency, which is imperceptible to a viewer. Unfortunately there are still undesirable consequences, which result from the alternating sequential presentation of left and right images multiple times.

Fast lateral movements of the subjects or the camera may create a marked and uncomfortable strobing or stuttering effect. Lateral image displacement resulting from these fast lateral subject or camera movements may become indiscernible from lateral image displacement due to the stereo offset. As a result, the audience may experience spatial confusion and/or discomfort. The root cause of this undesirable situation lies in the repeated presentation of each image (three times) and the related lack of updated or fresh imagery.

SUMMARY

In one exemplary embodiment, in rendering a computer-generated animation sequence, pieces of animation corresponding to shots of the computer-generated animation sequence are obtained. Measurements of action in the shots are obtained. Frame rates, which can be different, for the shots are determined based on the determined measurements of action in the shots. The shots are rendered based on the determined frame rates for the shots. The rendered shots with frame rate information indicating the frame rates used in rendering the shots are stored.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF EXEMPLARY EMBODIMENTS

The following description sets forth numerous specific configurations, parameters, and the like. It should be recognized, however, that such description is not intended as a limitation on the scope of the present invention, but is instead provided as a description of exemplary embodiments.

Figure 1:
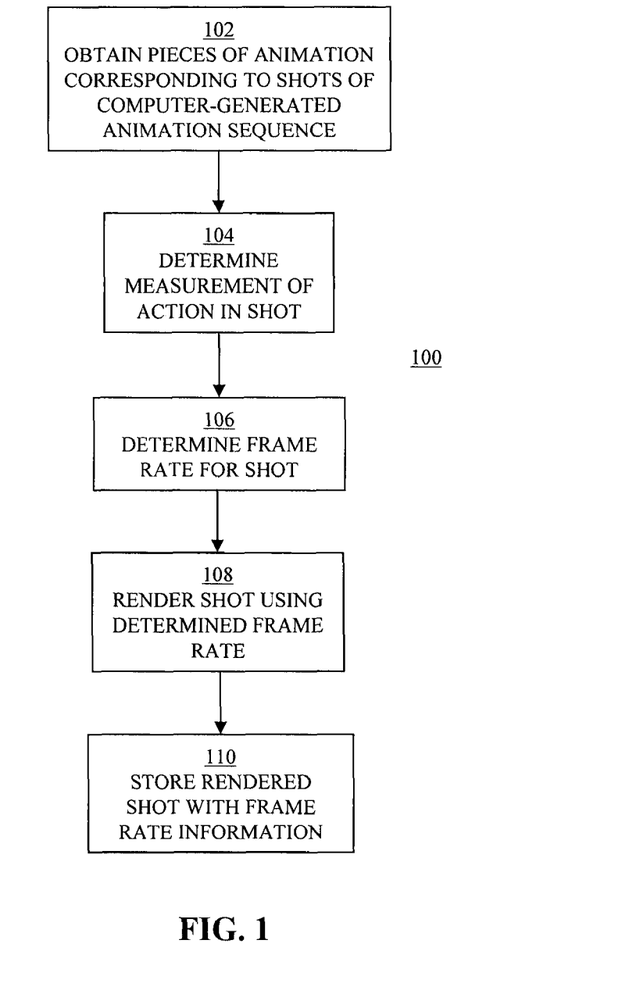
FIG. 1 is a flow diagram illustrating an exemplary process for rendering a computer-generated animation sequence.

FIG. 1 shows an exemplary process 100 for rendering a computer-generated animation sequence. The sequence may be a stereoscopic or non-stereoscopic sequence. It should be recognized that process 100 can be preceded by any number of prior processes performed as part of an animation process for the computer-generated animation sequence. For example, in one prior process, the background and the basic shapes of the objects, including characters, within the computer-generated animation sequence may be created. Also, any number of processes can be performed subsequent to process 100 as part of the animation process for the computer-generated animation sequence.

In block 102, a piece of animation corresponding to a shot of the computer-generated animation sequence is obtained. The piece of animation has one or more motion parameters that define motion of a virtual camera or one or more objects in the shot.

For the sake of clarification, the term "shot" is used herein to refer to an interval during which a scene is captured by the virtual camera. Thus, the computer-generated animation sequence is made up of a series of shots that have been edited together. An individual shot is typically defined by a transition, such as a cut, fade, or dissolve, at the beginning and end of the shot. The individual shot can be rendered as any number of individual frames of the computer-generated animation sequence.

Figure 2A:
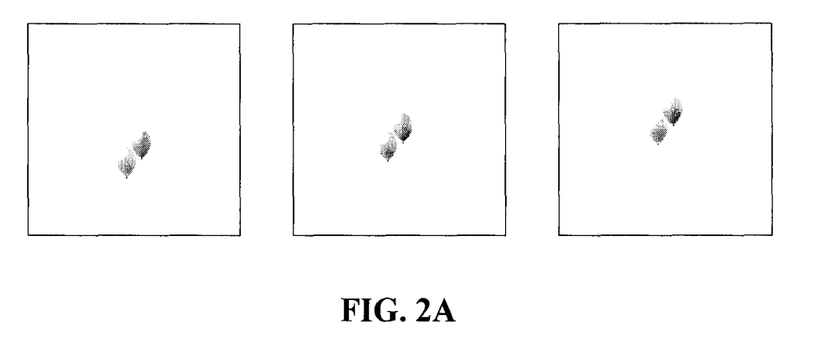
FIG. 2A depicts exemplary frames of a shot in an exemplary computer-generated animation sequence.

For example, assume one shot of a computer-generated animation sequence is that of two balloons rising in the sky. FIG. 2A depicts this shot rendered as multiple frames, with each frame showing the two balloons located at different positions within the scene (in this example, the sky). When these frames are displayed in sequence, the two balloons appear to rise in the sky.

Prior to the shot being rendered as frames, a piece of animation, which corresponds to the shot, is defined using any number of parameters, including motion parameters that define the motion of the virtual camera or one or more objects in the shot. For example, as mentioned above, the piece of animation corresponding to the shot depicted in FIG. 2A can include motion parameters specifying the movement of the two balloons in the shot. Similarly, if the virtual camera moves in the shot, the piece of animation can include motion parameters that specify the movement of the virtual camera in the shot. The piece of animation can exist as data in a database. Thus, the piece of animation can be obtained from the database in various forms, including as a data file. The parameters of the piece of animation are used in rendering the shot as frames.

With reference again to FIG. 1, in block 104, a measurement of action in the shot is determined, based on the one or more motion parameters of the piece of animation corresponding to the shot. In one exemplary embodiment, the measurement of action is a numerical measurement of image displacement over time in a field of view of the virtual camera in the shot. The measurement of action can be expressed as a percent of the field of view of the virtual camera (i.e., a given point on a subject or background has moved a certain percentage of the field of view of the virtual camera).

Figure 3A:
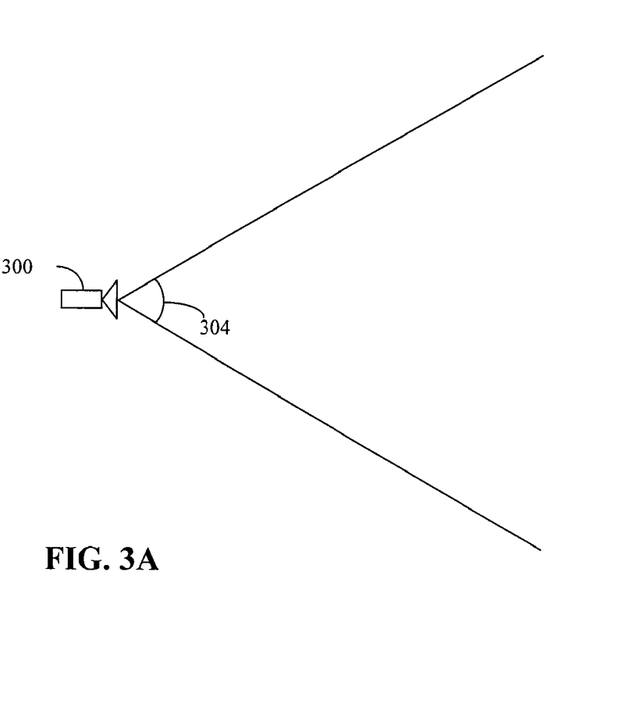
FIG. 3A depicts a horizontal field of view of a virtual camera.
Figure 3B:
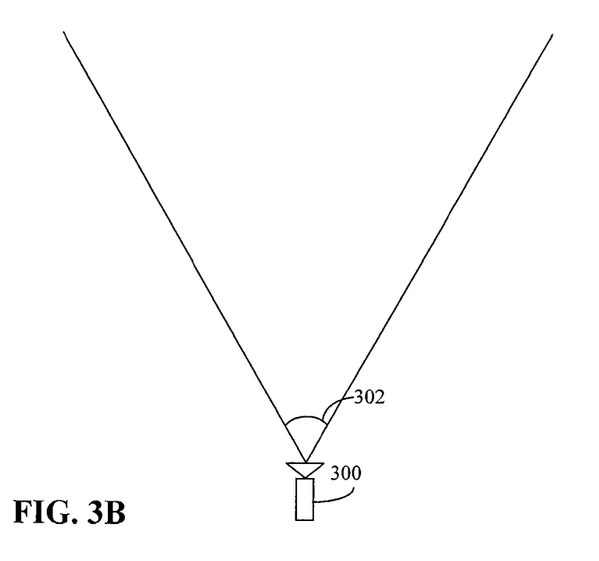
FIG. 3B depicts a vertical field of view of a virtual camera.

FIG. 3A depicts a top-down view of a frame from a shot with a virtual camera 300 with a horizontal field of view 302. FIG. 3B depicts a side view of the frame with virtual camera 300 with a vertical field of view 302. Typically, an aspect ratio (horizontal field of view to vertical field of view) of 2.4 is used.

Figure 4:
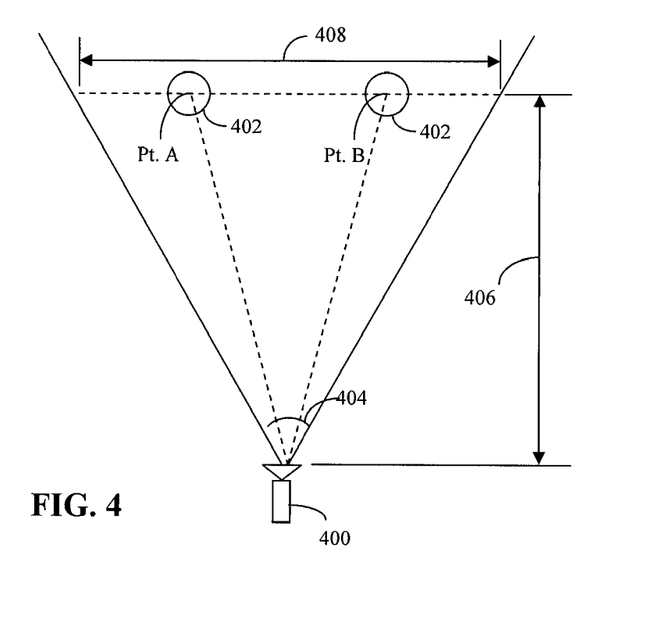
FIG. 4 depicts an object moving within the horizontal field of view of a stationary virtual camera.

As one example of determining a measurement of action, FIG. 4 depicts an object 402 moving through a field of view 404 of a stationary virtual camera 400 in a shot. As depicted in FIG. 4, if the camera-to-subject distance 406 is known, a field width at camera-to-subject distance 408 can be determined. In particular, field width at camera-to-subject distance 408 is 2×TAN((field of view 404)/2)× camera-to-subject distance 406. Thus, if field of view 404 is 60 degrees, camera-to-subject distance 408 is 10 ft., then field width at camera-to-subject distance 408 is 11.6 ft. (i.e., 2×TAN(60 degrees/2)×10 ft.). Assume in this example that object 402 moves from left to right 5 ft. in 3 seconds. If the measurement of action is expressed as a percent of field of view 404, then the measurement of action in this example is 14.367 percentage of field of view per second (i.e., (5 ft./11.6 ft.)/3 seconds). Note, the same result could have been arrived at based on information on the location information of object 402 (i.e., that object 402 was at position A at time t1 and at position B at time t2) rather than the rate of movement of object 402.

Figure 5:
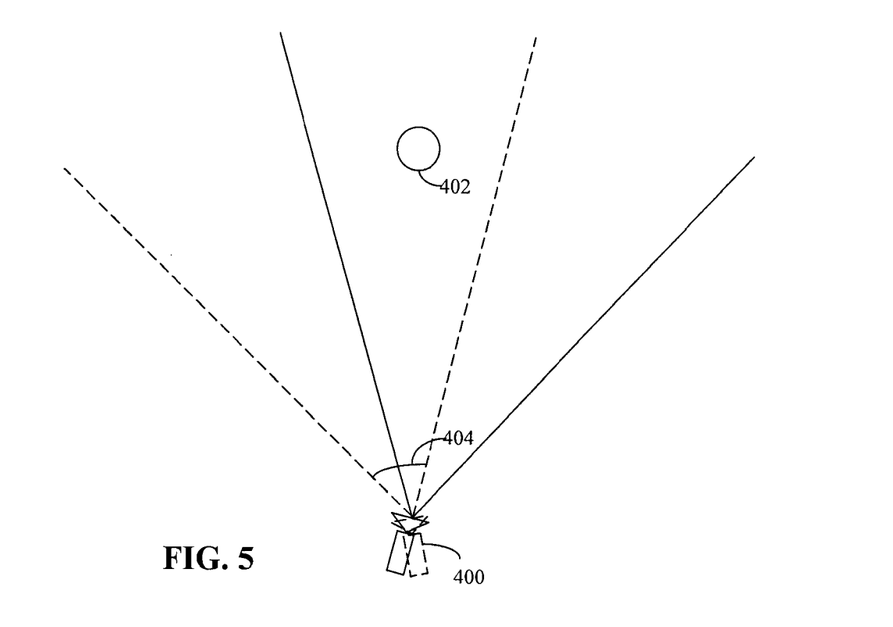
FIG. 5 depicts a stationary object with a moving virtual camera.

As another example, FIG. 5 depicts a stationary object 402 and a moving camera field of view in a shot. Assume in this example that virtual camera 400 rotates clockwise at a rate of 10 degrees per second. Assume also that the virtual camera rotates a total of 30 degrees or for a period of 3 seconds. If the measurement of action is again expressed as a percent of field of view 404, then the measurement of action in this example is 16.667% per second (i.e., (60 degrees/30 degrees)/3 seconds).

Although the first example above had a moving object and a stationary virtual camera, and the second example above had a stationary object and a moving virtual camera, it should be recognized that the measurement of action can be determined for a moving object and a moving virtual camera. In particular, measurement of action can be determined based on the amount of relative movement between the moving object and the moving virtual camera.

In block 106, a frame rate is determined for the shot, based on the determined measurement of action in the shot. For example, the determined measurement of action in the shot can be compared to a threshold. If the determined measurement of action is below the threshold, the frame rate can be set to one value, such as 24 frames per second. If the determined measurement of action is not below the threshold, the frame rate can be set to another value, which is higher, such as 60 frames per second. For example, if the determined measurement of action is less than 20% of the field of view per second, then the frame rate can be set to 24 frames per second. If the determined measurement is not less than 20% but less than 30% of the field of view per second, then the frame rate can be set to 36 frames per second. If the determined measurement is not less than 30% of the field of view per second, then the frame rate can be set to 72 frames per second.

In addition to the measurement of action, various characteristics of the one or more objects in the shot can be used in determining the appropriate frame rate to be used. For example, the size of the object, the brightness of the object, the position of the object, etc., can be given different weights. A set of rules and a threshold can then be used to determine the frame rate to be used. For example, if the object's speed is greater than a specified threshold and the object is located within a zone that is close to the center of the scene, then one frame rate (e.g., 60 frames per second), which is higher than another frame rate (e.g., 24 frames per second), is used, unless the surface area of the object is smaller than a specified threshold.

In block 108, the shot is rendered using the determined frame rate. As mentioned above, the shot can be rendered as any number of frames. The number of frames is determined based on the determined frame rate. Thus, a greater number of frames are rendered for the shot at a frame rate of 60 frames per second than at 24 frames per second.

In block 110, the rendered shot (i.e., the rendered frames of the shot) is stored with frame rate information indicating the determined frame rate for the shot. For example, the frame rate information can be stored as tags with the frames of the rendered shot. In subsequently projecting/displaying the computer-generated animation sequence, a digital projector may read the frame rate information (e.g., the tags) and present the corresponding frames at the specified frame rates. In some embodiments, the frame rate information can include metadata embedded in each frame of the computer-generated animation sequence. In some embodiments, this indicator could be stored in a "sidecar" file (also known as a buddy file or connected file) linked to the frames through time codes. It should be recognized that other approaches for associating the frame rate information with the frames of the computer-generated animation sequence can also be used.

Process 100 can be iterated for any number of shots of the computer-generated animation sequence. In this manner, different shots can be rendered at different frame rates, based on the amount of action determined for the shots.

Figure 2B:
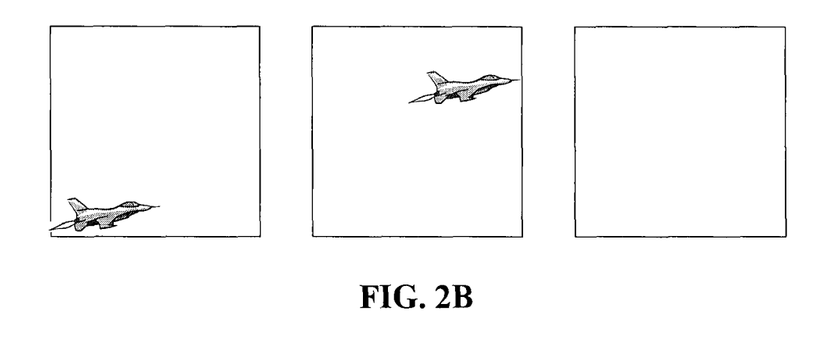
FIG. 2B depicts exemplar frames of another shot in an exemplary computer-generated sequence.

For example, as described above, FIG. 2A depicts rendered frames of a shot of two balloons rising in the sky. Now assume another shot is that of an airplane flying across the sky. FIG. 2B depicts this shot rendered as multiple frames, with each frame showing the airplane located at different positions within the scene (in this example, the sky). When these frames are displayed in sequence, the airplane appears to fly across the sky. As can be readily appreciated, the measure of action associated with the first shot (i.e., of the two balloons rising in the sky) is much lower than that associated with the second shot (i.e., of the airplane flying across the sky). Thus, using process 100, the frame rate determined for the first shot is lower than the frame rate determined for the second shot. Thus, the frames for the first shot are rendered at a lower frame rate, such as 24 frames per second, than the frames for the second shot, which are rendered at a higher frame rate, such as 60 frames per second.

Figure 6:
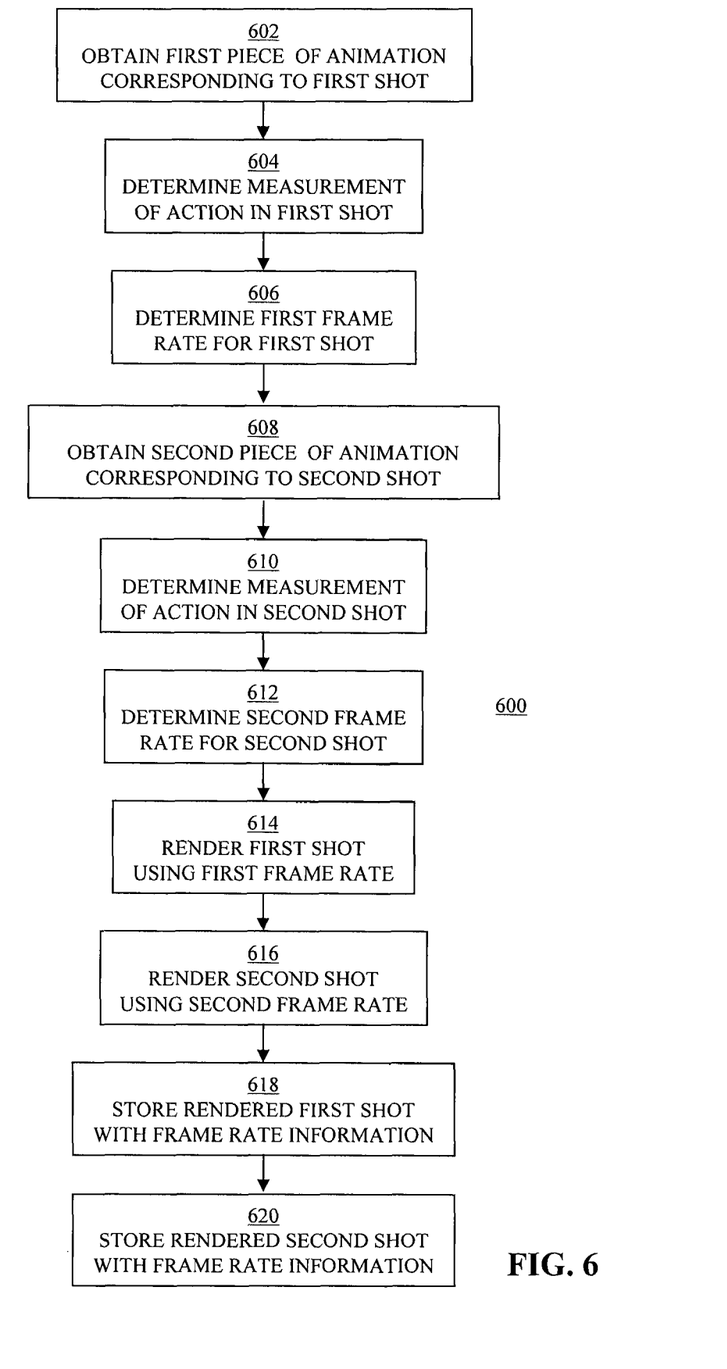
FIG. 6 is a flow diagram illustrating another exemplary process for rendering a computer-generated animation sequence.

For the sake of clarity, FIG. 6 depicts exemplary process 600, which corresponds to process 100 being iterated to process at least two shots. In particular, in block 602, a first piece of animation corresponding to a first shot of the computer-generated animation sequence is obtained. In block 604, a measurement of action in the first shot is determined, based on the one or more motion parameters of the first piece of animation corresponding to the first shot. In block 606, a first frame rate is determined for the first shot, based on the determined measurement of action in the first shot. In block 608, a second piece of animation corresponding to a second shot of the computer-generated animation sequence is obtained. In block 610, a measurement of action in the second shot is determined, based on the one or more motion parameters of the second piece of animation corresponding to the second shot. In block 612, a second frame rate, which is different from the first frame rate, is determined for the second shot, based on the determined measurement of action in the second shot. In block 614, the first shot is rendered using the first frame rate. In block 616, the second shot is rendered using the second frame rate. In block 618, the rendered first shot (i.e., the rendered frames of the first shot) is stored with frame rate information indicating the first frame rate. In block 620, the rendered second shot (i.e., the rendered frames of the second shot) is stored with frame rate information indicating the second frame rate.

As mentioned above, process 100 (FIG. 1) can be used to render a stereoscopic sequence. For D-Cinema-compliant 3D projection, a first frame rate of 24 frames per second, a second frame rate of 36 frames per second, and a third frame rate of 72 frames per second can be used. Note, the frame rates of 24, 36, and 72 frames per second are integer divisors of the 144 Hz frequency at which a typical digital projector operates and corresponds to triple, double, and single-flashing modes, respectively. Thus, different operating frequencies are not required to project the frames of the stereoscopic sequence at these different rates, which allows for a standard digital projector with existing hardware to be used. It is contemplated that only software will be needed to direct the digital projector to project the stereoscopic sequence using different frame rates.

In the above processes, the higher refresh rates will in most cases reduce or eliminate undesirable strobing and stuttering effects. Filmmakers or videogame makers will thereby be free to move the subject and camera as they see fit, without the restrictions imposed by other systems.

The above processes may also yield the side-benefit of imparting fast-action sequences with heightened visceral impact. For example, physiological research carried out in the 1970s found that higher frame rate film presentation may elicit exaggerated physiological responses in the viewing audience. The processes intelligently take advantage of this phenomenon when desired without an increase in render and storage overhead that would result from a global frame rate increase.

Figure 7:
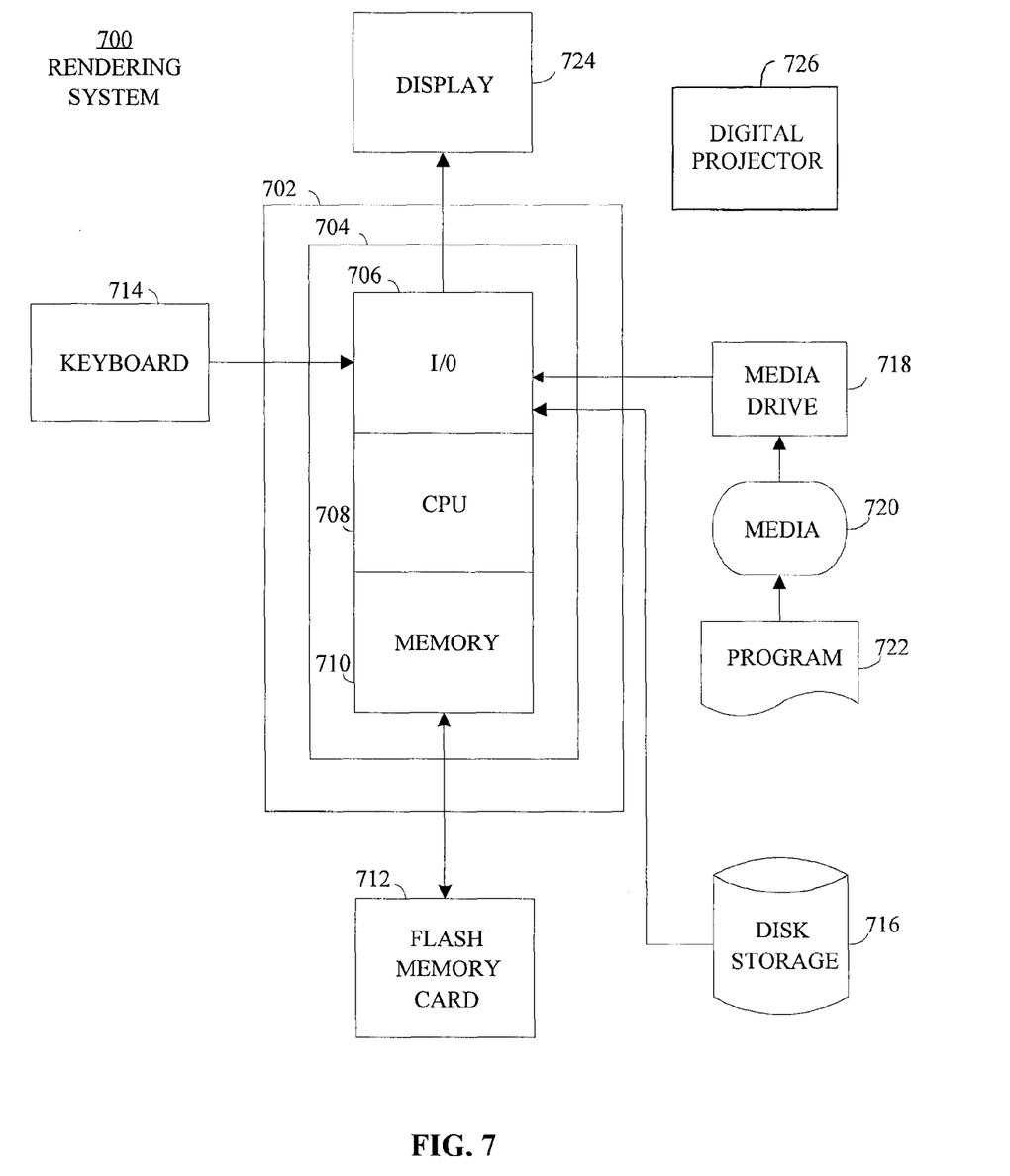
FIG. 7 is a block diagram of an exemplary rendering system.

FIG. 7 depicts an exemplary rendering system 700 configured to perform any one of the above-described processes. In this context, rendering system 700 may include, for example, a processor, memory, storage, and input/output devices (e.g., monitor, keyboard, disk drive, Internet connection, etc.). However, rendering system 700 may include circuitry or other specialized hardware for carrying out some or all aspects of the processes. In some operational settings, rendering system 700 may be configured as a system that includes one or more units, each of which is configured to carry out some aspects of the processes either in software, in hardware, or in some combination thereof.

FIG. 7 depicts rendering system 700 with a number of components that may be used to perform the above-described processes. The main system 702 includes a motherboard 704 having an input/output ("I/O") section 706, one or more central processing units ("CPU") 708, and a memory section 710, which may have a flash memory card 712 related to it. The I/O section 706 is connected to a display 724, a keyboard 714, a disk storage unit 716, and a media drive unit 718. The media drive unit 718 can read/write a computer-readable medium 720, which can contain programs 722 and/or data.

At least some values based on the results of the above-described processes can be saved for subsequent use. For example, the outputs of the system, including the rendered shots (i.e., rendered frames of the shots) with frame rate information, can be stored directly for application in a storage device, such as in memory (e.g., RAM (Random Access Memory)), disk storage 716, computer-readable medium 720, and the like. Digital projector 726 can retrieve the rendered frames of the shots, along with the frame rate information, read the frame rate information, and display the frames of the shots at different frame rates based on the read frame rate information.

Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

Although the above-described processes have been described in connection with the rendering of a computer-generated animation sequence, aspects of the above-described processes are applicable to a non-animation sequence (i.e., a live-action sequence). In particular, the process for determining a frame rate to use for a shot can be used for a live-action sequence.

Figure 8:
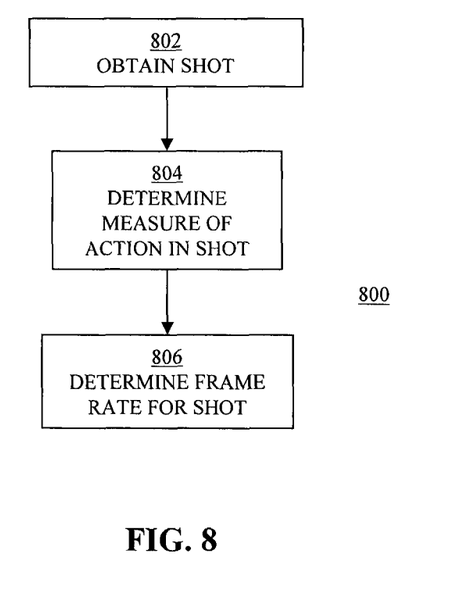
FIG. 8 is a flow diagram illustrating an exemplary process for determining frame rates for a live-action sequence.

For example, FIG. 8 depicts an exemplary process 800 for a live-action sequence. In block 802, a shot of the live-action sequence is obtained. Note, for a live-action sequence, the shot was created/shot using a frame rate, before the shot is obtained in block 802.

In block 804, a measurement of action in the shot is determined. For example, a motion-detection algorithm may be used to determine the amount of action in the shot. The motion-detection algorithm can employ various techniques for detecting motion in successive frames of the shot.

For example, a block-matching algorithm locates matching blocks in successive frames for determining motion. More specifically, the distance between two matching blocks and the elapsed time between the two frames containing the matching blocks provide an estimate of the motion of the block. The algorithm makes use of criteria to determine whether a given block in a particular frame matches the searched block in another frame. See Iain E. G. Richardson, *Video Codec Design: Developing Image and Video Compression Systems* (Wiley 2002).

As another example of a technique for detecting motion in successive frames of the shot, an edge-detection and tracking algorithm first extracts the edges from an image. The detected edges can then be tracked throughout the frames for motion estimation. See J. Shen and S. Castan, *An optimal linear operator for step edge detection*, Computer Vision, Graphics and Image Processing, 54 (1992).

In block 806, a frame rate is determined for the shot based on the determined measure of action. In particular, if the amount of action in the shot is determined to likely yield problematic motion, a frame rate higher than the frame rate used to create/shoot the shot can be determined. For example, a frame rate of 24 frames per second is typically used for live-action sequences. Thus, a higher frame rate of 60 frames per second can be used, if the amount of action in the shot is determined to likely yield problematic motion. The shot can then be re-shot using the higher frame rate.

Although only certain exemplary embodiments have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A computer-implemented method for rendering a computer-generated animation sequence of shots, the method comprising:
   obtaining a first piece of animation corresponding to a first shot of the computer-generated animation sequence,
      wherein the first piece has one or more motion parameters defining relative motion between a virtual camera and one or more objects in the first shot;
   determining a measurement of action in the first shot based on the one or more motion parameters of the first piece;
   determining a first frame rate for the first shot based on the determined measurement of action in the first shot;
   obtaining a second piece of animation corresponding to a second shot of the computer-generated animation sequence,
      wherein the second piece has one or more motion parameters defining relative motion between a virtual camera and one or more objects in the second shot;
   determining a measurement of action in the second shot based on the one or more motion parameters of the second piece;
   determining a second frame rate for the second shot based on the determined measurement of action in the second shot,
      wherein the first and second frame rates are different,
      wherein the one or more motion parameters of the first piece or second piece specify locations of the virtual camera at different times in the first shot or second shot, respectively, and
      wherein the measurement of action in the first shot or second shot is determined based on the specified locations of the virtual camera in the first shot or second shot, respectively;
   rendering the first shot using the first frame rate;
   rendering the second shot using the second frame rate;
   storing the rendered first shot with frame rate information indicating the first frame rate; and
   storing the rendered second shot with frame rate information indicating the second frame rate, wherein the first and second frame rate information convey to a display device the first and second frame rates for displaying the first and second shots, respectively.

2. The computer-implemented method of claim 1, wherein the one or more motion parameters of the first piece or second piece specify locations of the one or more objects at different times in the first shot or second shot, respectively, and wherein the measurement of action in the first piece or second piece is determined based on the specified locations of the one or more objects in the first shot or second shot, respectively.

3. The computer-implemented method of claim 1, wherein determining a first frame rate comprises:
   comparing the determined measurement of action in the first shot to a threshold;
   if the determined measurement of action in the first shot is below the threshold, setting the first frame rate to a first value; and if the determined measurement of action in the first shot is not below the threshold, setting the first rate to a second value, wherein the second value is higher than the first value.

4. The computer-implemented method of claim 1, wherein determining a second frame rate comprises:
comparing the determined measurement of action in the second shot to a threshold;
if the determined measurement of action in the second shot is below the threshold, setting the second frame rate to a first value; and
if the determined measurement of action in the second shot is not below the threshold, setting the second rate to a second value, wherein the second value is higher than the first value.

5. The computer-implemented method of claim 1, further comprising:
obtaining a third piece of animation corresponding to a third shot of the computer-generated animation sequence,
wherein the third piece has one or more motion parameters defining motion of a virtual camera or one or more objects in the third shot;
determining a measurement of action in the third shot based on the one or more motion parameters of the third piece;
determining a third frame rate for the third shot based on the determined measurement of action in the third shot, wherein the first, second, and third frame rates are different;
rendering the third shot using the third frame rate;
storing the rendered third shot with frame rate information indicating the third frame rate.

6. The computer-implemented method of claim 5, wherein the computer-generated animation sequence is of stereoscopic images, and wherein the first, second, and third frame rates are 24, 36, and 72 frames per second, respectively.

7. The computer-implemented method of claim 1, wherein rendering the first and second shots comprises:
rendering frames for the first and second shots, wherein the numbers of frames rendered for the first and second shots are determined based on the first and second frame rates, respectively.

8. The computer-implemented method of claim 7, further comprising:
retrieving the rendered frames and frame rate information of the first shot and the second shot;
reading the frame rate information retrieved with the frames of the first shot and second shot; and
displaying the frames of the first shot and second shot at the first frame rate and second frame rate, respectively, based on the read frame rate information.

9. The computer-implemented method of claim 8, wherein the computer-generated animation sequence is of stereoscopic images, wherein displaying the frames comprises:
alternating left and right images.

10. A non-transitory computer-readable storage medium having computer-executable instructions for rendering a computer-generated animation sequence, comprising instructions for:
obtaining a first piece of animation corresponding to a first shot of the computer-generated animation sequence,
wherein the first piece has one or more motion parameters defining relative motion between a virtual camera and one or more objects in the first shot;
determining a measurement of action in the first shot based on the one or more motion parameters of the first piece;
determining a first frame rate for the first shot based on the determined measurement of action in the first shot;
obtaining a second piece of animation corresponding to a second shot of the computer-generated animation sequence,
wherein the second piece has one or more motion parameters defining relative motion between a virtual camera and one or more objects in the second shot;
determining a measurement of action in the second shot based on the one or more motion parameters of the second piece;
determining a second frame rate for the second shot based on the determined measurement of action in the second shot,
wherein the first and second frame rates are different,
wherein the one or more motion parameters of the first piece or second piece specify locations of the virtual camera at different times in the first shot or second shot, respectively, and
wherein the measurement of action in the first shot or second shot is determined based on the specified locations of the virtual camera in the first shot or second shot, respectively;
rendering the first shot using the first frame rate;
rendering the second shot using the second frame rate;
storing the rendered first shot with frame rate information indicating the first frame rate; and
storing the rendered second shot with frame rate information indicating the second frame rate, wherein the first and second frame rate information convey to a display device the first and second frame rates for displaying the first and second shots, respectively.

11. The computer-readable medium of claim 10, wherein the one or more motion parameters of the first piece or second piece specify locations of the one or more objects at different times in the first shot or second shot, respectively, and wherein the measurement of action in the first piece or second piece is determined based on the specified locations of the one or more objects in the first shot or second shot, respectively.

12. The computer-readable medium of claim 10, wherein instructions for determining a first frame rate comprises instructions for:
comparing the determined measurement of action in the first shot to a threshold;
if the determined measurement of action in the first shot is below the threshold, setting the first frame rate to a first value; and
if the determined measurement of action in the first shot is not below the threshold, setting the first rate to a second value, wherein the second value is higher than the first value.

13. The computer-readable medium of claim 10, wherein instruction for determining a second frame rate comprises instructions for:
comparing the determined measurement of action in the second shot to a threshold;
if the determined measurement of action in the second shot is below the threshold, setting the second frame rate to a first value; and
if the determined measurement of action in the second shot is not below the threshold, setting the second rate to a second value, wherein the second value is higher than the first value.

14. The computer-readable medium of claim 10, further comprising instructions for:
obtaining a third piece of animation corresponding to a third shot of the computer-generated animation sequence,
wherein the third piece has one or more motion parameters defining motion of a virtual camera or one or more objects in the third shot;
determining a measurement of action in the third shot based on the one or more motion parameters of the third piece;
determining a third frame rate for the third shot based on the determined measurement of action in the third shot, wherein the first, second, and third frame rates are different;
rendering the third shot using the third frame rate;
storing the rendered third shot with frame rate information indicating the third frame rate.

15. The computer-readable medium of claim 14, wherein the computer-generated animation sequence is of stereoscopic images, and wherein the first, second, and third frame rates are 24, 36, and 72 frames per second, respectively.

16. The computer-readable medium of claim 10, wherein instructions for rendering the first and second shots comprises instructions for:
rendering frames for the first and second shots, wherein the numbers of frames rendered for the first and second shots are determined based on the first and second frame rates, respectively.

17. A system to render a computer-generated animation sequence, comprising:
a processor configured to: obtain first and second pieces of animations corresponding to first and second shots, respectively, of the computer-generated animation sequence, determine measurements of action in the first and second shots based on motion parameters defining relative motion between a virtual camera and one more objects in the first or second shot, wherein the one or more motion parameters of the first piece or second piece specify locations of the virtual camera at different times in the first shot or second shot, respectively, and wherein the measurement of action in the first shot or second shot is determined based on the specified locations of the virtual camera in the first shot or second shot, respectively, determine a first frame rate for the first shot based on the determined measurement of action in the first shot, determine a second frame rate, which is different than the first frame rate, for the second shot based on the determined measurement of action in the second shot, render the first shot using the first frame rate, render the second shot using the second frame rate; and
a storage device operatively coupled to the processor and configured to store the rendered first and second shots with frame rate information, wherein the stored frame rate information for the rendered first shot indicates the first frame rate, and wherein the stored frame rate information for the rendered second shot indicates the second frame rate, wherein the first and second frame rate information convey to a display device the first and second frame rates for displaying the first and second shots, respectively.

18. The system of claim 17, further comprising:
a digital projector configured to retrieve the rendered first shot, the rendered second shot, and frame rate information stored in the storage device, read the frame rate information retrieved with the frames of the first and second shots, and display the frames of the first and second shots at the first and second frame rates, respectively, based on the read frame rate information.

* * * * *